(12) United States Patent
Sormani et al.

(10) Patent No.: US 8,198,370 B2
(45) Date of Patent: Jun. 12, 2012

(54) COATED SUBSTRATE

(75) Inventors: Patricia Mary Ellen Sormani, Newark, DE (US); James William O'Neil, Chadds Ford, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 319 days.

(21) Appl. No.: 12/345,166

(22) Filed: Dec. 29, 2008

(65) Prior Publication Data

US 2009/0198016 A1    Aug. 6, 2009

Related U.S. Application Data

(60) Provisional application No. 61/009,413, filed on Dec. 28, 2007.

(51) Int. Cl.
*C08F 8/30* (2006.01)
*C08L 75/12* (2006.01)

(52) U.S. Cl. ........................................ 525/125; 525/217

(58) Field of Classification Search ................ 525/125, 525/217, 459
See application file for complete search history.

(56) References Cited

U.S. PATENT DOCUMENTS

| | | | |
|---|---|---|---|
| 4,045,517 A * | 8/1977 | Guerin et al. ................. | 525/203 |
| 4,659,799 A | 4/1987 | Nahas et al. | |
| 4,743,653 A * | 5/1988 | Numata et al. ................. | 525/125 |
| 4,871,806 A * | 10/1989 | Shalati et al. ................. | 525/108 |
| 5,283,290 A | 2/1994 | Jung et al. | |
| 5,391,631 A | 2/1995 | Porsch et al. | |
| 5,516,820 A | 5/1996 | Babjak et al. | |
| 5,679,742 A * | 10/1997 | Valpey et al. ................... | 525/74 |
| 5,859,136 A | 1/1999 | Lewin et al. | |
| 6,013,739 A | 1/2000 | Bruennemann et al. | |
| 6,174,953 B1 | 1/2001 | Huybrechts | |
| 6,239,214 B1 | 5/2001 | Huybrechts et al. | |
| 6,326,059 B1 * | 12/2001 | Lewin et al. ................... | 427/379 |
| 6,344,502 B1 * | 2/2002 | Babjak et al. ................. | 523/500 |
| 6,387,167 B1 * | 5/2002 | Haldankar ................. | 106/31.59 |
| 6,541,571 B1 * | 4/2003 | Haldankar ..................... | 525/217 |
| 7,226,976 B2 * | 6/2007 | Koto et al. ..................... | 525/218 |
| 8,034,362 B2 * | 10/2011 | Thomas et al. ................ | 424/423 |
| 2003/0018124 A1 | 1/2003 | Barsotti et al. | |
| 2005/0003094 A1 | 1/2005 | Grady et al. | |
| 2006/0100305 A1 | 5/2006 | Ma | |
| 2006/0100353 A1 | 5/2006 | Barsotti et al. | |
| 2007/0009740 A1 | 1/2007 | Burgman et al. | |
| 2010/0055480 A1 * | 3/2010 | Sormani et al. ............... | 428/458 |
| 2010/0056729 A1 * | 3/2010 | Sormani et al. ............ | 525/329.5 |

FOREIGN PATENT DOCUMENTS

| | | |
|---|---|---|
| EP | 996652 B1 | 3/2000 |
| WO | WO 0185813 A | 11/2001 |

* cited by examiner

*Primary Examiner* — Randy Gulakowski
*Assistant Examiner* — Mike M Dollinger
(74) *Attorney, Agent, or Firm* — Brian J Myers

(57) ABSTRACT

The present invention relates to a substrate coated with a coating composition wherein the coating composition comprises a crosslinkable component and the crosslinkable component is a mixture of two different and optionally three different acrylic polymers. Each acrylic polymer has functional groups present that are reactive with a crosslinking component. The functional groups present on each polymer have different rates of reactivity with the crosslinking component.

10 Claims, No Drawings

COATED SUBSTRATE

CROSS-REFERENCE TO RELATED APPLICATION

This application claims priority under 35 U.S.C. §119 from U.S. Provisional Application Ser. No. 61/009,413, filed Dec. 28, 2007, which is hereby incorporated by reference in its entirety.

FIELD OF THE INVENTION

This invention is related to a two-pack coating composition comprising at least two different crosslinkable polymers wherein each of the two polymers provide functional groups having different rates of reactivity toward isocyanate functional crosslinking groups. The crosslinkable polymers provide a coating composition that has a long pot life and also cures quickly when applied to a substrate and allow the applied coating to be sanded and or buffed in a short amount of time.

DESCRIPTION OF THE RELATED ART

Solvent-based refinish coating compositions generally include a first pack that comprises a crosslinkable component and a second pack that comprises a crosslinking component, which are mixed prior to application and crosslink upon application to produce coatings having excellent properties. One problem associated with such coating compositions is the relatively long time required to cure these compositions. Such long cure times cut down the productivity in automotive refinish shops by requiring the automobile to remain for a longer period of time in the area in which it was spray coated. A rapid initial cure is also desirable to produce a coating that can be readily sanded or buffed without fouling sandpaper. Such a rapid initial cure would permit the user to readily remove coated automobile or truck bodies out of the spray booths and allow them to fully cure at other convenient locations. As a result, productivity of coating autobodies can be improved substantially.

Attempts have been made to decrease the curing time of two pack-coating compositions by using more reactive components or catalysts. However, while the use of such components decreases curing time, the higher reactivity of such components usually reduces the time to gelation or pot life of the coating composition as well. In the extreme case, instant gelation of the composition can occur when, for example, the polyisocyanate is mixed with compounds or polymers having reactive amine groups. Thus, a need still exists for a two-pack coating composition that cures rapidly while still having an acceptable pot life.

U.S. Pat. No. 6,326,059 and U.S. Pat. No. 6,471,185 both to DuPont, disclose a dual cure resin comprising in the range of from 0.5 to 8.0 weight percent, based on the weight of the binder component solids of secondary amine moieties and also comprising in the range of from 5.0 to 70 weight percent, based on the weight of the binder component solids of hydroxyl moieties. The resin system cures rapidly in a first stage to produce a coating surface that can be readily buffed or sanded. Thereafter, over a period of days, a second stage cure takes place to produce a coating having excellent coating properties.

SUMMARY OF THE INVENTION

The present invention relates to a substrate coated by a dried and cured layer of a coating composition wherein the coating composition comprises a crosslinkable component and a crosslinking component and wherein said crosslinkable component comprises;
a) polymer A comprising in the range of from 10 to 25 percent by weight of primary hydroxy functional monomers;
b) polymer B comprising in the range of from 0.5 to 5 percent by weight of amine functional monomers; and optionally,
c) polymer C comprising in the range of from 5 to 25 percent by weight of secondary hydroxy functional monomers and monomers having primary hydroxy functional monomers.

DETAILED DESCRIPTION OF THE INVENTION

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

"Crosslinkable component" means a component that includes a compound, polymer, copolymer or a polydisperse mixture of compounds, polymers and/or copolymers all having functional groups that are capable of reacting with functional groups on the crosslinking component (during the curing step) to produce a coating in the form of crosslinked structures.

"Crosslinking component" is a component that includes a compound, polymer, copolymer or a polydisperse mixture of compounds, polymers, and/or copolymers all having functional groups that are capable of crosslinking with the functional groups on the crosslinkable component (during the curing step) to produce a coating in the form of crosslinked structures.

"Binder" or "binder solids" means the total weight of the film-forming portion of the coating composition. Typically, the binder only includes those portions that form a continuous network. Pigments, initiator, catalysts and other non-film-forming ingredients are not included.

"Two-pack coating composition" means a coating composition comprising two components stored in separate containers. These containers are typically sealed to increase the shelf life of the components of the coating composition. The components are mixed prior to use to form a pot mix. The pot mix has a limited pot life typically of minutes (about 30 minutes to 60 minutes) to a few hours (1 hour to 2 hours). The pot mix is applied as a layer, typically through a spray nozzle, of desired thickness on a substrate, such as an automobile body. After application, the layer is cured under ambient conditions or bake cured at elevated temperatures to form a coating on the substrate having desired coating properties, such as, for example, high gloss, mar-resistance and resistance to environmental etching.

"GPC weight average molecular weight" and "GPC number average molecular weight" means a weight average molecular weight (Mw) and a number average molecular weight (Mn), respectively, and are measured by utilizing gel permeation chromatography. A high performance liquid chromatograph (HPLC) supplied by Hewlett-Packard; Palo Alto, Calif. was used. Unless stated otherwise, tetrahydrofuran was used as the liquid phase and polystyrene was used as the standard.

All patents, patent applications and publications referred to herein are incorporated by reference in their entirety.

The present invention relates to a coating composition comprising a crosslinkable component and a crosslinking component, wherein the crosslinkable component comprises at least two polymers. Each of the polymers have functional groups or combinations of functional groups that react with an isocyanate group at different rates. By choosing the types of functional groups, the concentration and the placement of the functional groups on the polymer chains and the concentration of each of the polymers in the coating composition, a coating composition can be produced having a long pot life and that also has an initial cure that allows it to be sanded and/or buffed in a relatively short amount of time.

The crosslinkable component comprises at least two polymers, polymer A and polymer B. An additional polymer, polymer C, is optional. Polymer A contains functional groups consisting essentially of primary hydroxy groups. Polymer B contains functional groups comprising at least amine functional groups. Optional polymer C comprises both primary and secondary hydroxy functional groups.

Polymer A contains in the range of from 10 percent to 25 percent of monomers having a primary hydroxy group. Preferably, polymer A comprises in the range of from 15 percent to 25 percent of monomers having a primary hydroxy group and, more preferably, comprise in the range of from 18 percent to 22 percent of monomers having a primary hydroxy group. All weight percents are based upon the total charge of monomers for polymer A. Preferably, polymer A is substantially free from other monomers that have isocyanate reactive functional groups. Polymer A has a glass transition temperature (Tg) in the range of from −20° C. to 100° C., preferably in the range of from 0° C. to 90° C., and more preferably, in the range of from 40° C. to 80° C. Polymer A has a weight average molecular weight (Mw) in the range of from 1,000 to 40,000, preferably in the range of from 1,500 to 30,000, and more preferably in the range of from 2,000 to 27,000.

The monomers having primary hydroxy functional groups are, for example, 4-hydroxybutyl acrylate or 4-hydroxybutyl methacrylate. Other primary hydroxy group containing monomers are known, for example, ω-hydroxyalkyl acrylates and ω-hydroxyalkyl methacrylates, wherein the alkyl ester portion contains 2 to 6 carbon atoms. Combinations thereof are also suitable.

Polymer B comprises in the range of from 0.5 percent to 5 percent of monomers having amine functional groups. Preferably, polymer B comprises in the range of from 0.5 percent to 3.5 percent of monomers having amine functional groups and most preferably, contains in the range of from 1 to 3 percent of monomers containing amine functional groups. All weight percents are based upon the total charge of monomers for polymer B. Polymer B has a glass transition temperature (Tg) in the range of from −20° C. to 100° C., preferably in the range of from 0° C. to 90° C., and more preferably, in the range of from 40° C. to 80° C. Polymer B has a weight average molecular weight (Mw) in the range of from 1,000 to 40,000, preferably in the range of from 1,500 to 30,000, and more preferably in the range of from 2,000 to 27,000.

The monomers containing amine functional groups are preferably t-butylamino ethyl acrylate or t-butylamino ethyl methacrylate. The amine functionality may also be introduced in a variety of ways, for example, by post reacting a polymer containing glycidyl (meth)acrylate with a primary amine or with an alkanol amine having primary amine groups. Suitable primary amines include n-propyl amine, isopropyl amine, n-butyl amine, isobutyl amine, t-butyl amine, any of the isomeric hexyl amines, any of the isomeric octyl amines and benzyl amine. Suitable alkanol amines include ethanolamine, propanol amine, butanol amine and methyl ethanolamine.

Polymer B can further comprise monomers having primary hydroxy functional groups. Preferred examples of monomers having a primary hydroxy group are 2-hydroxyethyl acrylate and 2-hydroxyethyl methacrylate.

Optional polymer C comprises in the range of from 5 percent to 25 percent of monomers having primary hydroxy functional groups and monomers having secondary hydroxy functional groups. Preferably, polymer C comprises in the range of from 15 percent to 25 percent of monomers having primary hydroxy functional groups and monomers having secondary hydroxy functional groups and most preferably, contains in the range of from 18 to 22 percent of monomers having primary hydroxy functional groups and monomers having secondary hydroxy functional groups. All weight percents are based upon the total charge of monomers for polymer C. The ratio of primary hydroxy functional groups to secondary hydroxy functional groups in polymer C is in the range of from 10/90 to 90/10. Polymer C can have a glass transition temperature (Tg) in the range of from −20° C. to 100° C., preferably in the range of from 0° C. to 90° C., and more preferably, in the range of from 40° C. to 80° C. Polymer C can have a weight average molecular weight (Mw) in the range of from 1,000 to 40,000, preferably in the range of from 1,500 to 30,000, and more preferably in the range of from 2,000 to 27,000.

Primary hydroxy functional monomers are preferably 4-hydroxybutyl acrylate and/or 4-hydroxybutyl methacrylate. The secondary hydroxy functional group is preferably from 2-hydroxypropyl acrylate or 2-hydroxypropyl methacrylate. Other secondary hydroxy group containing monomers are known or can be produced according to various means. For example, the reaction of a 1,2 epoxy compound with acrylic or methacrylic acid will produce secondary hydroxy functional acrylate and methacrylate monomers which can then be polymerized to form a polymer having secondary hydroxy functional groups. Alternatively, polymer C can be polymerized with carboxylic acid functional groups and the resulting polymer can be post-reacted with epoxy functional molecules to produce the secondary hydroxy functional groups.

Polymer C can also comprise monomers having amine groups although this is not preferred. If present, the amount of amine functional monomers in polymer C should remain low, less than 2 percent by weight based on the total weight of the monomers in polymer C.

Polymers A, B and optional polymer C also comprise various monomers that do not have an isocyanate reactive functional group. For example, styrene, alpha-methyl styrene, vinyl toluene; alkyl acrylates and alkyl methacrylates having from 1-18 carbon atoms in the alkyl portion, such as, for example, methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, pentyl acrylate, pentyl methacrylate, hexyl acrylate, hexyl methacrylate, 2-ethyl hexyl acrylate 2-ethyl hexyl methacrylate, nonyl acrylate, nonyl methacrylate, lauryl acrylate, lauryl methacrylate, stearyl acrylate, stearyl methacrylate; cycloaliphatic acrylate and cycloaliphatic methacrylates, such as, for example, cyclohexyl acrylate, cyclohexyl methacrylate, isobornyl acrylate, isobornyl methacrylate, trimethylcyclohexyl acrylate, trimethylcyclohexyl methacrylate; glycidyl acrylate, glycidyl methacrylate, benzyl acrylate, benzyl methacrylate or a combination thereof.

Polymers A, B and optional polymer C can be independently produced in a variety of polymerization processes known to those of ordinary skill in the art. The polymers can be linear, branched, core-shell polymers or a combination thereof. Linear polymers are preferred and can be produced by conventional process well known to those of ordinary skill in the art. Typically, solvent is added to a reactor and brought to reflux at elevated temperatures under a nitrogen blanket. Optionally, before adding heat, the reactor may be fed with a portion of the monomer mixture and one or more typical initiator, such as the azo type initiators, which include 2,2'-azobis-2,4-dimethylpentane nitrile; peroxides, such as di-tertiarybutyl peroxide; and hydroperoxides. Commercially available peroxy type initiator t-butylperacetate or TRIGANOX® B from Akzo Nobel is suitable for use in the present invention. Upon attaining the desired polymerization temperature, the initiator and the all or part of the monomer mixture are fed to the reactor over a period of time.

The crosslinkable component comprises polymer A in the range of from 20 to 99 percent by weight, polymer B in the range of from 1 to 20 percent by weight and polymer C in the range of from 0 to 75 percent by weight, wherein the percentages are based on 100 percent weight of the polymers A, B and C in the crosslinkable component.

To modify the properties of the coating, the coating composition may also comprise, in addition to the previously described polymers A, B and C, one or more crosslinkable resins as known in the art. Preferred crosslinkable resins include for example, polyesters having at least one or more isocyanate reactive functionalities, for example, hydroxy groups. Suitable polyesters have a weight average molecular weight (Mw) varying in the range of from 2,000 to 20,000, preferably varying in the range of from 3,000 to 10,000.

The polyester suitable for use in the present invention may be any conventional polyester conventionally polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form or a mixture thereof. Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl)isocyanate, polyethylene glycol and polypropylene glycol. If desired, monohydric alcohols, such as, for example, butanol, octanol, lauryl alcohol, ethoxylated or propoxylated phenols may also be included along with polyhydric alcohols. The details of polyester suitable for use in the present invention are further provided in the U.S. Pat. No. 5,326,820, which is incorporated herein by reference. One example of the commercially available polyester suitable for use is SCD®-1040 polyester, which is supplied by Etna Product Inc., Chagrin Falls, Ohio.

The crosslinkable component may also include various polyether polyols to improve the properties of the coating. Various polyether polyols may be used as is known to those of ordinary skill in the art. One preferred polyether polyol is polytrimethylene ether polyol. The polytrimethylene ether polyol has a number average molecular weight in the range of from 500 to 5,000 and is present in the crosslinkable component in the range of from about 1 to about 25 percent by weight of the binder. The polytrimethylene ether polyol is preferably produced via the polymerization of 1,3-propane diol that has been produced from the fermentation of a renewable resource. One particularly preferred renewable resource is corn since it is readily available and has a high rate of conversion to 1,3-propanediol and can be genetically modified to improve yields to diol. Typical bio-conversion processes are shown in U.S. Pat. Nos. 5,686,276, 5,633,362 and 5,821,092. U.S. Pat. No. '276 teaches a bio-conversion process of a fermentable carbon source to 1,3-propanediol by a single microorganism. U.S. Pat. No. '362 and U.S. Pat. No. '092 show the bio-conversion of glycerol to 1,3-propanediol by recombinant bacteria harboring a foreign gene encoding a diol dehydratase. The aforementioned patents are incorporated herein by reference.

The coating composition of the present invention comprises a crosslinkable component with at least polymer A and polymer B and also comprises at least one crosslinking component. The crosslinking component comprises at least one polyisocyanate.

Any of the conventional aromatic, aliphatic, cycloaliphatic, polyisocyanates, trifunctional polyisocyanates and polyisocyanate functional adducts of a polyol and a polyisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane and 4,4'-diisocyanatodiphenyl ether.

Typical trifunctional isocyanates include triphenylmethane triisocyanate, 1,3,5-benzene triisocyanate and 2,4,6-toluene triisocyanate. Trimers of diisocyanates also can be used, such as the trimer of hexamethylene diisocyanate, which is supplied by Bayer Corporation, Pittsburgh, Pa., under the trademark DESMODUR® N-3390. Other suitable polyisocyanates from Bayer Corporation include DESMO-DUR® N-3300 and Z-4470 BA polyisocyanates.

The relative amount of crosslinking agent used in the coating composition is adjusted to provide a molar equivalent ratio of NCO/(OH+NH) in the range of from 0.5/1 to 2/1, preferably in the range of from 0.75/1 to 1.8/1 and more preferably in the range of from 0.85/1 to 1.5/1.

The coating composition preferably includes one or more catalysts to enhance crosslinking of the components during curing. Generally, the coating composition includes in the range of from 0.005 percent to 2 percent, preferably in the range of from 0.01 to 1 percent and more preferably in the range of from 0.02 percent to 0.7 percent of the catalyst, the percentages being in weight percentages based on the total weight of the crosslinkable and crosslinking component solids. These catalysts are preferably added to the binder component. Typical catalysts include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, zinc octoate, zinc naphthenate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The coating composition of the present invention is a solventborne coating composition. Some of the suitable solvents include aromatic hydrocarbons, such as petroleum naphtha or xylenes; esters, such as, ethyl acetate, butyl acetate, t-butyl acetate, isobutyl acetate or hexyl acetate; and glycol ether esters, such as propylene glycol monomethyl ether acetate; ketones, such as, for example, methyl amyl ketone, methyl ethyl ketone, methyl isobutyl ketone; or a combination thereof. The amount of organic solvent added depends upon the desired solids level as well as the desired amount of VOC of the composition. If desired, the organic solvent may be added to both the crosslinking and crosslinkable components of the coating composition.

The amount of solvent added to the coating composition may be adjusted to provide the composition with a VOC (volatile organic content) in the range of from 0.12 kilograms (1.0 pounds per gallon) to 0.78 kilograms (6.5 pounds per gallon) of the solvent per liter of the coating composition.

The coating composition of the present invention may also contain conventional additives, such as pigments, stabilizers, and rheology control agents, flow agents, and toughening agents. Such additional additives will depend on the intended use of the coating composition. For example, any additives that would adversely affect the clarity of the cured coating will not be included when the composition is formulated as a clear coating. The foregoing additives may be added to either component or both, depending upon the intended use of the coating composition. The coating composition of the present invention can be formulated as a primer composition, a basecoat composition or a clear coat composition.

The phrase clear coating composition is intended to describe a layer of the dried and cured coating composition. While a coating composition may be clear, the uncured coating composition may be semi-transparent, opaque or milky white.

Typical pigments that can be used in the coating composition are filler pigments such as talc, china clay, barytes, carbonates, silicates, and color pigment such as metallic oxides such as titanium dioxide, zinc oxide and iron oxide and carbon black and organic colored pigments and dyes. Also useful as pigments that can be added to the composition include the following: metallic oxides, such as titanium dioxide, zinc oxide, iron oxides of various colors, carbon black; filler pigments, such as talc, china clay, barytes, carbonates, silicates; and a wide variety of organic colored pigments, such as quinacridones, copper phthalocyanines, perylenes, azo pigments, indanthrone blues, carbazoles, such as carbozole violet, isoindolinones, isoindolones, thioindigo reds, benzimidazolinones; metallic flake pigments, such as aluminum flakes, mica flakes, pearlescent flakes, or a combination thereof.

To improve weatherability of the coating, 0.1 to 5 weight percent, preferably 0.5 to 2.5 weight percent and more preferably 1 to 2 weight percent of ultraviolet light stabilizers screeners, quenchers and antioxidants can be added to the composition, the percentages being based on the total weight of the binder and crosslinking components solids. Typical ultraviolet light screeners and stabilizers include for example, benzophenones, such as hydroxy dodecycloxy benzophenone, 2,4-dihydroxy benzophenone, and hydroxy benzophenones containing sulfonic acid groups; benzoates, such as dibenzoate of diphenylol propane and tertiary butyl benzoate of diphenylol propane; triazines, such as 3,5-dialkyl-4-hydroxyphenyl derivatives of triazine and sulfur containing derivatives of dialkyl-4-hydroxy phenyl triazine, hydroxy phenyl-1,3,5-triazine; triazoles, such as 2-phenyl-4-(2,2'-dihydroxy benzoyl)-triazole and substituted benzotriazoles, such as hydroxy-phenyltriazole; hindered amines, such as bis-(1,2,2,6,6-pentamethyl-4-piperidinyl sebacate) and di-[4-(2,2,6,6-tetramethyl piperidinyl)]sebacate; and any mixtures of any of the above.

In general, the first-pack of the two-pack coating composition contains the crosslinkable component and the second-pack contains the crosslinking component. The two components are mixed just prior to use or about 5 to 30 minutes before use to form a pot mix. A layer of the pot mix can be applied to a substrate by conventional techniques, such as spraying, electrostatic spraying, roller coating, dipping or brushing. Generally, at least one layer of pot mix having a thickness in the range of from 25 micrometers to 75 micrometers is applied over a metal substrate, such as automotive body. After application of the layer(s) of pot mix, the layer of coating composition is dried and cured. Drying may take place at ambient conditions or it can be a forced drying technique using moving air, heated air or a combination thereof. The curing step can take place concurrently with the curing step and is generally under similar conditions as the drying step.

Generally, within about 90 minutes to about 2 hours after application, the applied layer of the coating composition cures sufficiently to allow for buffing and polishing, if needed, to remove imperfections and improve the surface of the finish. The applied coating composition continues to cure and after several days, it reaches a level of hardness and toughness required for a durable and weatherable automotive finish.

The coating composition of the present invention is suitable for providing coatings on a variety of substrates, such as metal, wood and concrete substrates and resinous surfaces, such as, for example, RIM (reaction injection molded) auto bumpers and dashboards. The present composition is suitable for providing clear or pigmented coatings (i.e. primer compositions or basecoat compositions) in automotive OEM (original equipment manufacturer) applications and especially suitable for refinish applications typically used in making repairs and touch-ups to automotive bodies. Obviously, the coating composition is also well suited for use in other applications, such as coating truck bodies, boats, airplanes, tractors, cranes and other metal bodies. The coating composition of the present invention is also suitable for use in industrial and maintenance coating applications.

EXAMPLE

The acronym tbaema as used herein is tert-butylaminoethyl methacrylate.

TI-PURE® R-900 is titanium dioxide and 12305S activator is CHROMA PREMIER® 12305S activator, both available from DuPont, Wilmington, Del.

LUPEROX® 7M75 is available from Arkema Inc., Philadelphia, Pa.

BYK® 320, wetting aid, BYK® 405, rheology control agent and ANTI TERRA-U®, dispersant are all available from BYK Chemie, Wallingford, Conn.

MISTRON MONOMIX® talc is available from Luzenac, Inc., Oakville, Ontario.

Zinc Phosphate J0852 is available from Rockwood Pigments, Beltsville Md.

AEROSIL® R-972 silica is available from Degussa GmbH, Dusseldorf, Germany.

Barium Sulfate EWO is available from Sachtleben Chemie, Gmbh, Duisberg, Germany.

Nitrocellulose #5978 is 20% nitrocellulose in 70% butyl acetate and 10% isopropanol, available as #5978 from the Scholle Chemical Corporation, Atlanta, Ga.

BENTONE® 38 organophillic clay is available from Elementis, Hightstown, N.J.

TEXAPHOR® 963 dispersing aid is available from Cognis, Monheim, Germany.

Burgess NO. 40® is hydrous aluminum silicate available from Burgess Pigments, Sandersville Ga.

OCTA-SOLIGEN® ZINC 8, zinc octoate is available from the Lanxess Corporation, Pittsburgh, Pa.

Unless otherwise noted, all ingredients, at the time of this disclosure, were available from the Aldrich Chemical Company, Milwaukee, Wis.

The following test procedures were used;

Gardner-Holdt viscosity was determined according to ASTM D1545.

The Zahn viscosity of the pot mix (mixture of all of the components of the coating composition) of the coating compositions was measured by using the appropriate Zahn cup supplied by VWR Scientific Products Corporation. The viscosity was measured as soon as the pot mix was prepared and at the designated intervals thereafter. The reading was recorded as number of seconds it took for the pot mix to drain from the Zahn cup [ASTM D1084 (Method D)].

Persoz Hardness Test—The change in film hardness of the coating was measured with respect to time by using a Persoz hardness tester Model No. 5854 (ASTM D4366), supplied by Byk-Mallinckrodt, Wallingford, Conn. The number of oscillations (referred to as Persoz number) was recorded.

Fischer Hardness was determined using a FISCHERSCOPE® hardness tester, available from the Fischer Technology, Inc., Windsor, Conn.

Preparation of Polymer 1

26.34 grams of butyl acetate was added to a round bottom flask equipped with a stirrer, a condenser, thermometer, and a dropping funnel. The solvent was heated to reflux. A solution of 10.74 grams styrene, 5.02 grams of 2-ethyl hexyl methacrylate, 9.33 grams of methyl methacrylate, 15.05 grams of isobornyl methacrylate and 10.03 grams of 4-hydroxy butyl acrylate in 2.39 grams of butyl acetate was added over a 240-minute period. A second solution was added over a 330-minute period concurrently with the first portion. The second solution was a mixture of 1 gram of LUPEROX® 7M75 in 17.96 grams of butyl acetate. When the second solution was added, the reaction was stirred at reflux for an additional 60 minutes, then cooled to room temperature. 2.13 grams of butyl acetate were added. The resulting polymer solution had a solids content of 49.9 percent, a Gardner-Holdt viscosity of L, a weight average molecular weight of 22,451, a number average molecular weight of 7097 and a calculated Tg of 57° C.

Preparation of Polymer 2

26.43 grams of butyl acetate was added to a round bottom flask equipped with a stirrer, a condenser, thermometer, and a dropping funnel. The solvent was heated to reflux. A solution of 10.77 grams styrene, 5.03 grams of 2-ethyl hexyl methacrylate, 9.36 grams of methyl methacrylate, 15.10 grams of isobornyl methacrylate and 10.07 grams of 4-hydroxy butyl acrylate in 2.40 grams of butyl acetate was added over a 240-minute period. A second solution was added over a 330-minute period concurrently with the first portion. The second solution was a mixture of 0.67 grams of LUPEROX® 7M75 in 18.02 grams of butyl acetate. When the second solution was added, the reaction was stirred at reflux for an additional 60 minutes, then cooled to room temperature. 2.14 grams of butyl acetate was added. The resulting polymer solution had a solids content of 49.6 percent, a Gardner-Holdt viscosity of P, a weight average molecular weight of 28,064 and a number average molecular weight of 8868.

Preparation of Polymer 3

26.25 grams of butyl acetate was added to a round bottom flask equipped with a stirrer, a condenser, thermometer, and a dropping funnel. The solvent was heated to reflux. A solution of 10.70 grams styrene, 5.00 grams of 2-ethyl hexyl methacrylate, 9.30 grams of methyl methacrylate, 15.00 grams of isobornyl methacrylate and 10.00 grams of 4-hydroxy butyl acrylate in 2.39 grams of butyl acetate was added over a 240-minute period. A second solution was added over a 330-minute period concurrently with the first portion. The second solution was a mixture of 1.33 gram of LUPEROX® 7M75 in 17.90 grams of butyl acetate. After the second solution was added, the reaction was stirred at reflux for an additional 60 minutes, then cooled to room temperature. 2.12 grams of butyl acetate was added. The resulting polymer solution had a solids content of 49.6 percent, a Gardner-Holdt viscosity of I+¼, a weight average molecular weight of 17,794 and a number average molecular weight of 6438.

Preparation of Polymer 4

26.43 grams of butyl acetate was added to a round bottom flask equipped with a stirrer, a condenser, thermometer, and a dropping funnel. The solvent was heated to reflux. A solution of 10.82 grams of styrene, 7.55 grams of 2-ethyl hexyl methacrylate, 9.31 grams of methyl methacrylate, 12.58 grams of isobornyl methacrylate, 5.03 grams of 4-hydroxybutyl acrylate, and 5.03 grams of 2-hydroxypropyl methacrylate in 2.40 grams of butyl acetate was added over a period of 240 minutes. A second solution was added over a 330-minute period concurrently with the first portion. The second solution was a mixture of 0.67 gram of LUPEROX® 7M75 in 18.02 grams of butyl acetate. After the second solution was added, the reaction was stirred at reflux for an additional 60 minutes, then cooled to room temperature. 2.13 grams of butyl acetate were added. The resulting polymer solution had a solids content of 49.3 percent, a Gardner-Holdt viscosity of R+¼, a weight average molecular weight of 26,776, a number average molecular weight of 9516, and a calculated Tg of 64.2° C.

Preparation of Polymer 5

26.43 grams of butyl acetate was added to a round bottom flask equipped with a stirrer, a condenser, thermometer, and a dropping funnel. The solvent was heated to reflux. A solution of 10.82 grams of styrene, 7.55 grams of 2-ethyl hexyl methacrylate, 9.31 grams of methyl methacrylate, 12.58 grams of isobornyl methacrylate, 5.03 grams of 4-hydroxybutyl acrylate, and 5.03 grams of 2-hydroxypropyl methacrylate in 2.40 grams of butyl acetate was added over a period of 240 minutes. A second solution was added over a 330-minute period concurrently with the first portion. The second solution was a mixture of 0.67 gram of LUPEROX® 7M75 in 18.02 grams of butyl acetate. When the second solution was added, the reaction was stirred at reflux for and additional 60 minutes, then cooled to room temperature. 2.14 grams of butyl acetate was added. The resulting polymer solution had a solids content of 49.7 percent, a Gardner-Holdt viscosity of Q, a weight average molecular weight of 24,606 and a number average molecular weight of 8235.

Preparation of Polymer 6

22.47 grams of butyl acetate and 3.96 grams of ethyl acetate was added to a round bottom flask equipped with a stirrer, a condenser, thermometer, and a dropping funnel. The solvent was heated to reflux. A solution of 17.62 grams of styrene, 10.07 grams of 2-ethyl hexyl methacrylate, 12.08 grams of methyl methacrylate, 9.06 grams of 2-hydroxyethyl methacrylate in 2.40 grams of butyl acetate was added over a 240-minute period. A second solution was added over a 330-minute period concurrently with the first portion. The second solution was a mixture of 0.67 gram of LUPEROX® 7M75 in 15.32 grams of butyl acetate and 2.70 grams of ethyl acetate. When the addition of the monomer solution was complete, a solution of 1.51 grams of tert-butyl aminoethyl methacrylate in 0.48 grams of butyl acetate was added all at once. When the addition of the LUPEROX® solution was complete, the reaction was refluxed for an additional 60 minutes, 1.66 grams of butyl acetate was added and the mixture was cooled to room temperature. The resulting polymer solution had a solids content of 48.4 percent, a Gardner-Holdt viscosity of X, a weight average molecular weight of 30,758, a number average molecular weight of 12908, and a calculated Tg of 62.5° C.

Preparation of Polymer 7

22.39 grams of butyl acetate and 3.95 grams of ethyl acetate was added to a round bottom flask equipped with a stirrer, a condenser, thermometer, and a dropping funnel. The solvent was heated to reflux. A solution of 17.56 grams of styrene, 10.03 grams of 2-ethyl hexyl methacrylate, 12.04 grams of methyl methacrylate, 9.03 grams of 2-hydroxyethyl methacrylate in 2.39 grams of butyl acetate was added over a 240-minute period. A second solution was added over a 330-minute period concurrently with the first portion. The second solution was a mixture of 1.0 gram of VAZO® 67 in 15.27 grams of butyl acetate and 2.69 grams of ethyl acetate. When the addition of the monomer solution was complete, a solution of 1.51 grams of tert-butyl aminoethyl methacrylate in 0.48 grams of butyl acetate was added all at once. When the addition of the LUPEROX® solution was complete, the reaction was refluxed for an additional 60 minutes, 1.65 grams of butyl acetate was added and the mixture was cooled to room temperature. The resulting polymer solution had a Gardner-Holdt viscosity of U+½, a weight average molecular weight of 22,260 and a number average molecular weight of 9,412.

Preparation of BENTONE® 38 Solution

In a suitable vessel equipped with a nitrogen inlet and a high speed dispersion mixer, is added 86.26 parts of xylene and 7.7 parts of BENTONE® 38 is slowly added. This mixture is mixed for 20 minutes. 3.5 parts of TEXAPHOR® 963 is slowly added and mixed for 10 minutes. 2.4 parts of methanol is added followed by 0.14 parts of water. This mixture is stirred for 20 minutes and is used as is.

Preparation of Polymer 8 (RCP16384)

25.04 parts of xylene is charged to a reactor equipped with a stirrer, a nitrogen inlet dropping funnels, and an agitator. The solvent was heated to reflux (138° C.-142° C.). A mixture of 14.91 parts of styrene, 7.46 parts of methyl methacrylate, 10.93 parts of acetoacetoxyethyl methacrylate, 12.42 parts of n-butyl acrylate, 3.98 parts of 2-hydroxyethyl acrylate and 11.4 parts of xylene were mixed and added to a-monomer feed tank. A mixture of 0.62 parts of LUPEROX® 7M75, 0.001 parts of LUPEROX® 26 and 7.039 parts of xylene were added to an initiator feed tank. The monomer mixture was added over a period of 120 minutes simultaneously with the initiator mixture, which was added over a 270-minute period. 1.5 parts xylene were used as a rinse for the monomer feed tank and lines and 1 part xylene was used as a rinse for the initiator feed tank and lines. When the addition was complete, the reaction was held at reflux for 60 minutes then cooled to room temperature. 3.7 parts of xylene was then added. The polymer had a solids content of 50%, and a Gardner-Holdt viscosity of L-O.

Preparation of Catalyst Solution 37.602 parts of acetonitrile and 13.708 parts of 3-chlorobenzoic acid are added to a reactor equipped with a nitrogen inlet and an agitator. 30.11 parts of tetrabutyl ammonium hydrogen sulfate was slowly added to this mixture with mixing. This was allowed to mix at least 8 hours. Cooling was added to the reactor. A solution of 7.106 parts of sodium hydroxide and 7.106 parts of deionized water were added slowly to the mixture at such a rate that the temperature of the reaction did not exceed 35° C. After about 90% of the caustic solution was added, the pH of the mixture was checked. Addition of the caustic solution was continued until the pH of the mixture was between 8 and 9. 4.367 parts of acetonitrile was added and the reaction was stirred overnight. The reaction mixture was filtered. 3 Å sieves were added to the filtrate so that the water content of the mixture was 0.9% to 1.1% water.

Preparation of Polymer 9

13.917 parts of tetrahydrofuran, 0.671 parts of 1-trimethylsiloxy-1-methoxy-2-methylpropene and 0.068 parts of catalyst solution was added to a reactor equipped with an agitator, nitrogen inlet. 6.561 parts of glycidyl methacrylate was from a monomer feed tank added over 30 minutes. When greater than 95% of the glycidyl methacrylate was consumed, a mixture of 11.538 parts of methyl methacrylate, 16.403 parts of n-butyl methacrylate and 18.857 parts of propylene carbonate were added to the reactor over 45 minutes from a monomer feed tank. When the addition was complete, two portions of 2.036 parts of propylene carbonate were added to the reactor through the monomer feed tank to rinse the tank. The reaction was stirred until the monomers were converted by infrared analysis. 0.347 parts of deionized water was added to the reaction mixture. The reaction was cooled to 50° C. and 6.938 parts of p-nitrobenzoic acid was added followed by the addition of 0.868 parts of benzyl trimethyl ammonium hydroxide. The reaction was heated to reflux and held until the acid number was less than 4.0. 21.796 parts of butyl acetate was added to the reactor and the reaction was cooled to 60° C. The mixture was filtered through a sparkler filter.

Preparation of Pigment Dispersion 1

A bottom feed sand mill was charged with 2.0 mm glass beads, 30.769 parts of butyl acetate, 35.385 parts of polymer 8 and 3.077 parts of polymer 9. This mixture was mixed for 30 minutes. The temperature of the mill was increased to 100° C. to 120° C. and 30.769 parts of MONARCH® 120 was slowly added. The mixture was ground at low speed in the mill for 2 hours.

Preparation of Black Dispersion 65.0 parts of pigment dispersion 1 were mixed at high speed in a mill for 15 minutes. A mixture of 15 parts of butyl acetate and 20 parts of polymer 8 was slowly added while mixing at low speed. When the addition was complete, the mixture was milled for 2 hours at high speed.

Preparation of Coating Compositions for Clear Coatings

Two clear coating compositions were prepared. Coating composition 1 contains three polymers according to the present invention. Coating composition 2 contains 2 of the polymers and does not contain the polymer that has amine functional groups. The coatings were prepared by mixing the ingredients in Table 1, in order, in a suitable vessel with mixing. When the additions were complete, the Zahn #2 viscosity of each was measured for an initial viscosity and then at intervals afterward according to Table 1.

Films were applied to ACT cold roll steel panels (part #APR33374), available from ACT Laboratories, Inc., using a 10-mil drawdown blade. The panels were allowed to dry and cure at room temperature. The Persoz Hardness was tested at 2, 3 and 24 hours after preparation and the results of the testing are shown in Table 1.

TABLE 1

| Ingredient | Coating composition 1 | Coating composition 2 (comparative) |
|---|---|---|
| Polymer 1 | 26.2 grams | 28.9 grams |
| Polymer 4 | 26.5 grams | 29.3 grams |
| Polymer 6 | 5.3 grams | 0.0 grams |
| 10% dibutyl tin dilaurate | 0.07 grams | 0.07 grams |
| Zinc naphthenate solution | 0.44 grams | 0.44 grams |
| Butyl acetate | 24.6 grams | 24.5 grams |
| 12350S activator | 16.9 grams | 16.8 grams |
| Total | 100 grams | 100 grams |

| | Coating Composition 1 | Coating composition 2 |
|---|---|---|
| Zahn #2 Viscosity (in seconds) | | |
| Initial | 25.7 | 25.1 |
| 15 minutes | 26.9 | 25.8 |
| 30 minutes | 28.1 | 26.4 |
| 45 minutes | 30.6 | 28.1 |
| 60 minutes | 34 | 31.6 |
| 90 minutes | 49.1 | 42.7 |
| 120 minutes | 123 | 89 |
| 150 minutes | gel | gel |
| Persoz Hardness | | |
| 2 hours | 31 | 30 |
| 3 hours | 55 | 46 |
| 24 hours | 218 | 213 |

Preparation of Primer Examples

Preparation of Primer Dispersions 1 to 4.

The ingredients of Portion 1 of TABLE 2 were added, in order, to a one-half gallon can equipped with a DBI stirrer. The can is equipped with a lid in order to minimize solvent escape during preparation. This mixture was sealed in order to minimize solvent loss and stirred for 15 minutes. The ingredients of Portion 2 were then added, in order, with stirring.

TABLE 2

| Ingredient | Primer Dispersion 1 | Primer Dispersion 2 (comparative) | Primer Dispersion 3 | Primer Dispersion 4 (comparative) |
|---|---|---|---|---|
| PORTION 1 | | | | |
| Butyl Acetate | 63.8 | 63.8 | 63.8 | 63.8 |
| Xylene | 46.2 | 46.2 | 46.2 | 46.2 |
| Methyl amyl ketone | 157.8 | 157.8 | 157.8 | 157.8 |
| Polymer 2 | 695.6 | 765.1 | | |
| Polymer 3 | 0 | 0 | 347.8 | 382.6 |
| Polymer 5 | 0 | 0 | 347.8 | 382.6 |
| Polymer 7 | 69.6 | 0 | 69.6 | 0 |
| Nitrocellulose #5978 | 90.9 | 90.9 | 90.9 | 90.9 |
| BYK © 320 | 19.1 | 19.1 | 19.1 | 19.1 |
| ANTI-TERRA U ® | 18.3 | 18.3 | 18.3 | 18.3 |
| Rheolgy Solution | 141.9 | 141.9 | 141.9 | 141.9 |
| Black Dispersion | 20.7 | 20.7 | 20.7 | 20.7 |
| BYK ® 405 | 10.4 | 10.4 | 10.4 | 10.4 |
| PORTION 2 | | | | |
| MISTRON MONOMIX ® | 130.7 | 130.7 | 130.7 | 130.7 |
| Zinc Phosphate J0852 | 189.7 | 189.7 | 189.7 | 189.7 |
| AEROSIL ® R-972 | 46.2 | 46.2 | 46.2 | 46.2 |
| Burgess NO. 40 ® | 392.1 | 392.1 | 392.1 | 392.1 |
| TI-PURE ® R-900 | 484.6 | 484.6 | 484.6 | 484.6 |
| Barium Sulfate EWO ® | 422.4 | 422.4 | 422.4 | 422.4 |
| Total | 3000 | 3000 | 3000 | 3000 |

Preparation of Primer Composition 1

To 1990 grams of Primer dispersion 1 was added 119 grams of Polymer 2, 12 grams of polymer 7, 18.7 grams of OCTA-SOLIGEN ZINC 8®, 3.2 grams 1% dibutyl tin diacetate in xylene, and 3.2 grams 2% dibutyl tin dilaurate in xylene. This mixture was stirred thoroughly and used as is.

Preparation of Primer Composition 2 (Comparative)

To 1832 grams of Primer dispersion 2 was added 120 grams of Polymer 2, 17.2 grams of OCTA-SOLIGEN ZINC 8®, 2.9 grams 1% dibutyl tin diacetate in xylene, and 2.9 grams 2% dibutyl tin dilaurate in xylene. This mixture was stirred thoroughly and used as is.

Preparation of Primer Composition 3

To 2409.85 grams of Primer dispersion 3 was added 72 grams of Polymer 3, 14 grams of polymer 7, 72 grams of polymer 5, 22.7 grams of OCTA-SOLIGEN ZINC 8®, 3.9 grams 1% dibutyl tin diacetate in xylene, and 3.9 grams 2% dibutyl tin dilaurate in xylene. This mixture was stirred thoroughly and used as is.

Preparation of Primer Composition 4 (Comparative)

To 2226.25 grams of Primer dispersion 4 was added 73 grams of Polymer 3, 73 grams of polymer 5, 20.9 grams of OCTA-SOLIGEN ZINC 8®, 3.6 grams 1% dibutyl tin diacetate in xylene, and 3.6 grams 2% dibutyl tin dilaurate in xylene. This mixture was stirred thoroughly and used as is.

Preparation of Reducer 1

A solution was prepared by mixing 10 parts methyl ethyl ketone, 10 parts methyl isobutyl ketone, 20 parts methyl amyl ketone, 35 parts butyl acetate and 25 parts xylene.

Preparation of Activator Solution 1

An activator solution was prepared by mixing 61.932 grams 12301S activator, 3.8068 grams methyl ethyl ketone, 3.8068 grams methyl isobutyl ketone, 7.6136 grams methyl amyl ketone, 13.3238 grams butyl acetate and 9.517 grams xylene.

Preparation of Activated Primer Compositions

Each of primer compositions 1 to 4 were activated by mixing 4 parts of the primer compositions with 1 part of Reducer 1 and 1 part Activator solution 1. The Zahn #3 viscosity of each primer composition was measured initially, at 30 minutes and at 60 minutes. Units are given in seconds.

|  | Primer Composition 1 | Primer Composition 2 (comp.) | Primer composition 3 | Primer composition 4 (comp.) |
| --- | --- | --- | --- | --- |
| Initial | 14.90 | 14.91 | 17.31 | 13.41 |
| 30 minutes | 32.44 | 46.25 | n/a | 19.36 |
| 60 minutes | n/a | n/a | n/a | n/a |

The primer compositions were then spray applied onto aluminum panels, (part#APR19055), supplied by ACT Test Panels, Inc. using a Devilbiss PRI gravity feed spray gun in 3 coats. Each layer of primer composition was applied to the next layer when the panel appeared to be dry and a gloved finger rubbed over the panel did not pick up any primer. The panels were then allowed to dry and cure at ambient temperature. One set of panels was rated for sanding by a sanding expert after drying for 60 minutes. A second set of panels was rated for sanding by a sanding expert after drying for 90 minutes.

|  | 60 minutes | 90 minutes |
| --- | --- | --- |
| Primer Composition 1 | Hand Sanding: no grab, medium heavy loading, very slight clogging<br>Dual Action Sanding: slight clogging<br>Wear Index: Good<br>Bear Down: clean | Hand sanding: no grab, heavy loading, very slight clogging<br>Dual Action Sanding: Slight loading<br>Wear Index: Good<br>Bear Down: Clean |
| Primer Composition 2 (comparative) | Hand Sanding: medium grab, heavy scarring, heavy clogging<br>Dual Action Sanding: slight clogging<br>Wear Index: n/a<br>Bear Down: Heavy Clogging | Hand Sanding: slight grabbing; heavy scarring, heavy clog<br>Dual Action: slight clogging |
| Primer Composition 3 | Hand Sanding: no grab, heavy loading, heavy clogging<br>Dual Action Sanding: slight clogging<br>Wear Index: Poor<br>Bear Down: clean | Hand Sanding: no grab, medium clogging<br>Dual Action Sanding: Slight clogging<br>Wear Index: Poor<br>Bear Down: Clean |
| Primer Composition 4 (comparative) | Hand Sanding: heavy grab, heavy loading, medium clogging<br>Dual Action Sanding: slight clogging<br>Wear Index: Poor<br>Bear Down: heavy clogging | Hand Sanding: Heavy grabbing, heavy loading and clogging<br>Dual Action Sanding: Slight clogging<br>Wear Index: n/a<br>Bear Down: heavy clogging |

The results of the sanding test indicate that primers containing a resin with primary amine groups in addition to resins with primary or secondary hydroxyl groups show better sanding at 1 hour and 90 minutes than the comparative primer example without the resin with primary amine groups. This is illustrated by comparing Primer composition 1 to primer composition 2, where primer composition 2 has more loading, scarring, and grabbing than primer composition 1. We see similar results when comparing primer composition 3 to primer composition 4, with primer composition 3 having the better performance of the two. All four of these compositions are showing fast reactivity as indicated by the short pot life, but the better performance is that obtained with the primer containing the resin with primary amine functionality.

What is claimed is:

1. A substrate coated by a dried and cured layer of a coating composition wherein the coating composition comprises a crosslinkable component and a crosslinking component and wherein said crosslinkable component comprises at least three polymers, a linear or branched acrylic polymer A and a linear or branched acrylic polymer B and a linear or branched acrylic polymer C wherein;
   a) the linear or branched acrylic polymer A, having a weight average molecular weight in the range of from 1,000 to 40,000 and comprises in the range of from 10 to 25 percent by weight of primary hydroxy functional monomers;
   b) the linear or branched acrylic polymer B, has a weight average molecular weight in the range of from 1,000 to 40,000 and comprises in the range of from 0.5 to 5 percent by weight of primary or secondary amine functional monomers; and
   c) the linear or branched acrylic polymer C, has a weight average molecular weight in the range of from 1,000 to 40,000 and comprises in the range of from 5 to 25 percent by weight of secondary hydroxy functional monomers and monomers having primary hydroxy functional groups wherein the crosslinkable component comprises polymer A in the range of from 20 to 99 percent by weight, polymer B in the range of from 1 to 20 percent by weight, and polymer C up to 75 percent by weight, wherein the percentages are based on 100 percent by weight of the polymers A, B and C in the crosslinkable component.

2. The substrate of claim 1 wherein the crosslinking component comprises at least one polyisocyanate.

3. The substrate of claim 1 wherein the primary hydroxy functional group of polymer A is from 4-hydroxybutyl acrylate or 4-hydroxybutyl methacrylate.

4. The substrate of claim 1 wherein the secondary amine functional group of polymer B is from t-butylaminoethyl acrylate or t-butylaminoethyl methacrylate.

5. The substrate of claim 1 wherein the secondary hydroxyl group of polymer C is from 2-hydroxypropyl acrylate or 2-hydroxypropyl methacrylate.

6. The substrate of claim 1 wherein the crosslinkable composition further comprises a polyester or polyether.

7. A coating composition comprising a crosslinkable component and a crosslinking component wherein said crosslinkable component comprises at least three polymers;
- a) a linear or branched acrylic polymer A having a weight average molecular weight in the range of from 1,000 to 40,000 and comprising in the range of from 10 to 25 percent by weight of primary hydroxy functional monomers;
- b) a linear or branched acrylic polymer B having a weight average molecular weight in the range of from 1,000 to 40,000 and comprising in the range of from 0.5 to 5 percent by weight of primary or secondary amine functional monomers; and,
- a linear or branched acrylic polymer C having a weight average molecular weight in the range of from 1,000 to 40,000 and comprising in the range of from 5 to 25 percent by weight of secondary hydroxy functional monomers and monomers having primary hydroxy functional groups;

wherein the crosslinkable component comprises polymer A in the range of from 20 to 99 percent by weight, polymer B in the range of from 1 to 20 percent by weight, and polymer C up to 75 percent by weight, wherein the percentages are based on 100 percent by weight of the polymers A, B and C in the crosslinkable component.

8. The substrate of claim 1 wherein the linear or branched acrylic polymer A is substantially free from other monomers that have isocyanate reactive functional groups.

9. The substrate of claim 1 wherein polymer C is present in the range of from 45 to 75 percent by weight, wherein the percentage by weight is based on 100 percent by weight of the polymers A, B and C in the crosslinkable component.

10. A process of applying a coating composition to a substrate said process comprising;
- 1) forming a pot mix comprising the coating composition of claim 7; and
- 2) applying said pot mix to the substrate.

* * * * *